Nov. 14, 1950   H. RITTER   2,529,573
OIL METERING DEVICE FOR SEWING MACHINES
Filed Nov. 12, 1947   2 Sheets-Sheet 2

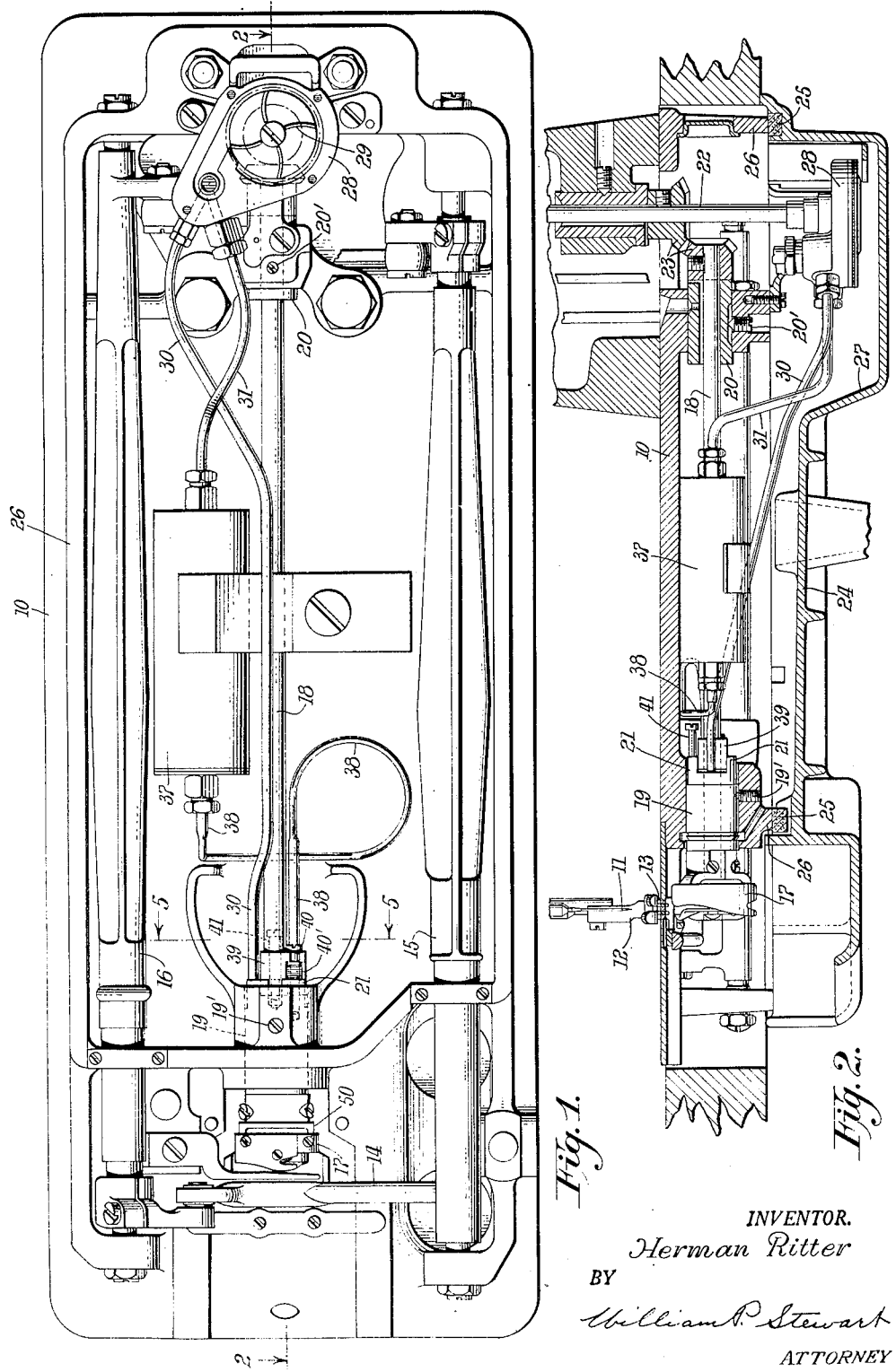

INVENTOR.
Herman Ritter
BY
William P. Stewart
ATTORNEY

Patented Nov. 14, 1950

2,529,573

UNITED STATES PATENT OFFICE 2,529,573

OIL METERING DEVICE FOR SEWING MACHINES

Herman Ritter, Cranford, N. J., assignor to The Singer Manufacturing Company, Elizabeth, N. J., a corporation of New Jersey Application November 12, 1947, Serial No. 785,347

7 Claims. (Cl. 112—256)

This invention relates to the lubrication of loop-takers for sewing machines; and more particularly to a metering device for regulating precisely the flow of lubricant from a source of supply to the raceway of a high-speed rotary hook.

In lubricating the rotary hook of a high-speed sewing machine, it is necessary to provide the raceway, in which the annular bearing-rib of the hook is journaled, with a substantially continuous supply of lubricant. On the other hand it is mandatory that this supply not exceed the amount utilized in the process of efficient lubrication. This is primarily for the reason that surplus lubricant in the hook may be picked up by the sewing threads, resulting in staining of the work. Secondarily, it is wasteful of lubricant. It is an object of this invention to provide a reliable means for metering the flow of lubricant to the hook in amounts corresponding to the relatively minute quantities dissipated in the raceway bearing thereof.

The quantity of lubricant required by the hook is dependent upon such variable factors as the speed of operation of the sewing machine, the condition of the bearings of the hook, and the quantity of lint, filler, or other extraneous matter contained in the work which tends to find its way into the hook to absorb and carry away the lubricant. Adjustments in the flow of lubricant are therefore required in the course of normal operation of a sewing machine. It is an object of this invention to provide in a lubricant metering device a means of adjustment whereby small compensating variations in the flow of lubricant may be made with both ease and accuracy.

Regardless of the care utilized in maintaining a clean supply of lubricant in the reservoir of a sewing machine, foreign matter invariably accumulates in the metering device and in the lines leading thereto. It is desirable, therefore, to periodically flush the system of dirt. It is, however, obviously not desirable in the purging process to drive the dirt into the small ducts in the body of the hook. It is a purpose of this invention to provide a metering device, the channels and supply lines of which may be flushed of accumulated dirt independently of the ducts in the hook.

It is obvious that this metering device may be adapted, within the scope of the invention herein disclosed, to facilitate efficient lubrication of other sewing machine elements such as the bearings disposed in the head portion of the sewing machine. The accompanying drawings are understood, therefore, to be illustrative of only one specific application of the invention.

In the drawings:

Fig. 1 is a bottom plan view of a sewing machine containing the present improvement.

Fig. 2 is a sectional view taken along the line 2—2 of Fig. 1 with the addition of an oil-pan, and with the hook including its driving shaft and lubricating system shown in side elevation.

Figure 3:
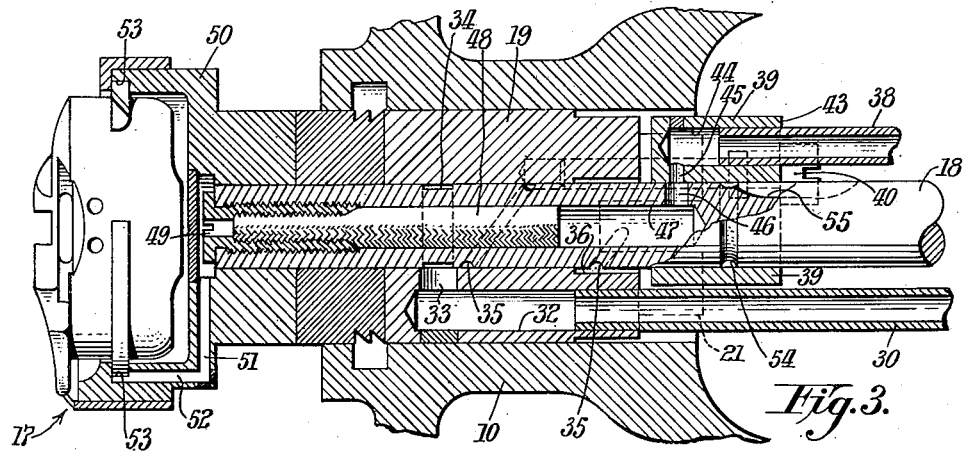
Fig. 3 is a sectional view taken substantially along the line 3—3 of Fig. 5.
Figure 4:
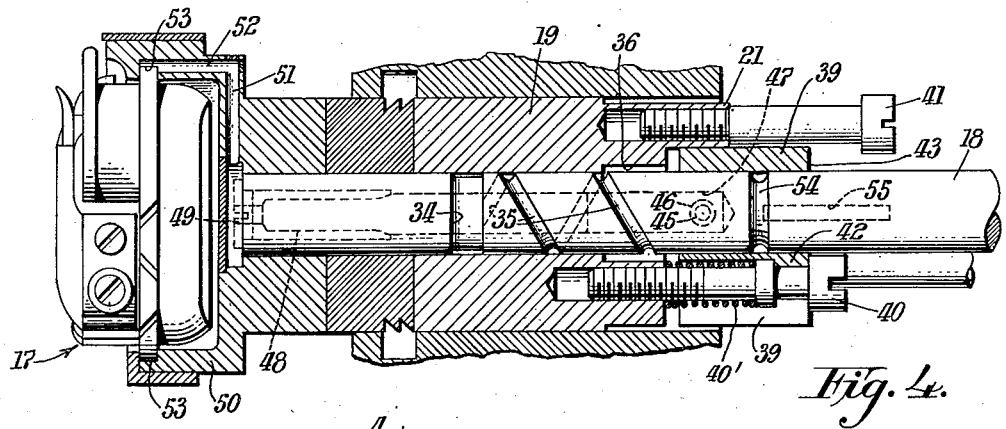
Fig. 4 is a sectional view taken substantially along the line 4—4 of Fig. 5.

In the embodiment of the invention selected for illustration, 10 represents a bed-portion of the frame of a sewing machine including a needle 11 and presser-foot 12 which operate in conjunction with a feed-dog 13 carried by a feed-bar 14. The feed-bar is actuated in a usual manner by a feed-advance rock-shaft 15 and a feed-lift rock-shaft 16. A rotary hook 17 is affixed to a rotary hook-shaft 18 journaled in bearing-bushings 19 and 20 which are secured to the frame by set screws 19' and 20', respectively. At its end remote from the hook, the bushing 19 is transversely slotted to form a pair of diametrically opposed arms 21. The rotary hook-shaft 18 is driven by a vertical shaft 22 through the pair of bevel-gears 23, the upper end of the shaft 22 being operatively connected to the usual needle-bar actuating shaft in the arm of the machine (not shown).

An oil-pan 24 is provided with a gasket 25 upon which rests the marginal flange 26 of the sewing machine frame. A cavity 27 in the oil-pan 24 forms a lubricant reservoir within which is disposed a centrifugal lubricant-pump 28 (shown in Fig. 1 with the bottom plate removed) carried by the bed of the machine. An impeller 29 for the pump is secured to the depending end of the vertical rotary shaft 22.

Leading from the discharge side of the pump are two tubes 30 and 31. The tube 30 conducts the lubricant to the front bearing-bushing 19, wherein the lubricant flows through a longitudinal bushing-bore 32 (Fig. 3) to a duct 33 radial with respect to the hook-shaft 18 and which opens into an annular channel 34 in the periphery of the hook-shaft. A spiral groove 35 in the hook-shaft, running rearwardly from the annular channel 34, carries the lubricant along the bearing surface and discharges it into a recess 36 in the bushing, from which point it gravitates back to the reservoir 27.

Figure 5:
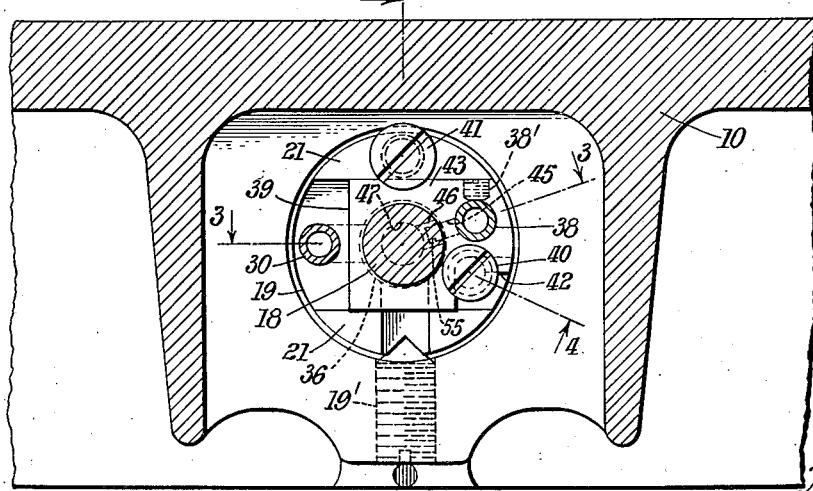
Fig. 5 is a sectional view taken along the line 5—5 of Fig. 1.

The tube 31 conducts the lubricant to a replaceable filtering device 37, which may be of any commercial type preferably having a filtering capacity of approximately five microns. From the filtering device the lubricant is led, by means of a looped tube 38 anchored by a set screw 38' (Fig. 5) to a gland 39 mounted upon the hook-shaft 18 for limited axial sliding movement relatively thereto. The gland is partially disposed between the diametrically opposed arms 21 of the bushing 19, and rotation of the gland relatively to the shaft is prevented thereby. A double headed adjusting-screw 40 and a stop-screw 41 are threaded into the inner end of the bearing-bushing 19. The double head of the adjusting screw straddles a shoulder 42 on the gland, and the head of the stop-screw 41 overhangs the face 43 of the gland to limit the movement of the gland. To shift the gland axially with repsect to the shaft, the adjusting screw 40 is turned in the desired direction. A spring 40' tends to prevent unauthorized turning of the screw caused by vibrations in the sewing machine. The loop in the tube 38 provides sufficient flexibility to permit the required movement of the gland.

The tube 38 discharges into a lubricant-cavity in the form of a longitudinal bore 44 in the gland 39 (Fig. 3). A gland-duct 45 radial with respect to the hook-shaft connects the longitudinal bore 44 with the periphery of the hook-shaft 18. A radial aperture 46 forming part of a lubricant-conducting channel in the hook-shaft receives the lubricant from the gland-aperture 45 and conducts it to an axial shaft bore 47. The axial bore 47 contains wicking 48 which conveys the lubricant to a point 49 within the hook-body 50. The lubricant is then channeled successively through the ducts 51 and 52 in the hook-body; the duct 52 discharging in the raceway 53 of the hook.

The metering device may be adjusted to its fully opened position by shifting the gland 39 axially upon the hook-shaft 18 to bring the opening of the gland duct 45 into coincidence with the circumferential path traced by the corresponding opening of the radial duct 46 in the hook-shaft upon rotation of the shaft. The flow of lubricant may be gradually decreased by shifting the gland along the hook-shaft until no parts of the respective duct openings coincide, at which time the flow of lubricant is terminated. As previously noted, the gland is shifted by means of the double-headed adjusting-screw 40 which straddles the shoulder 42 of the gland; the stop-screw 41 being utilized to limit the rearward movement of the gland.

The gland and lubricant-conducting lines may be purged of accumulated dirt by shifting the gland rearwardly on the hook-shaft by means of the adjusting-screw 40 until the gland engages the stop-screw 41 at which time the duct 45 discharges into an annular by-pass groove or channel 54 in the periphery of the hook-shaft. The lubricant is conducted from the annular groove 54 rearwardly beyond the extremities of the gland by means of a straight discharge groove 55 in the hook-shaft, after which it gravitates to the oil-pan.

Having thus set forth the nature of the invention, what I claim herein is:

1. A sewing machine having a frame including a bed-portion, a reservoir containing lubricant associated with the sewing machine and including means for establishing a flow of lubricant therefrom, a rotary loop-taker, a rotary shaft journaled in the bed-portion for actuating the loop-taker, a lubricant conducting line connecting to the reservoir for supplying lubricant to the loop-taker, a metering device for governing the flow of lubricant to the loop-taker, and a replaceable lubricant filter in said line disposed between the metering device and the reservoir.

2. In a sewing machine, a lubricating system comprising an oil reservoir, a rotary shaft having a lubricant-conducting bore and a radial inlet-duct leading to said bore, a gland apertured for sliding movement upon said shaft and being constrained against rotation with the shaft, said gland being provided with a lubricant-cavity and with an outlet-duct connecting said lubricant-cavity with the shaft aperature of the gland, means for shifting the gland lengthwise of the shaft to vary the position of said outlet-duct with respect to a position thereof in which said inlet-duct of the shaft intermittently traverses said outlet-duct upon rotation of the shaft, means for suppling lubricant from said reservoir to the cavity of the gland, a bearing having lubricant-conducting connections with the bore of the shaft, and by-pass means to purge said lubricating system, comprising a grooved-portion in said shaft within the range of sliding of said gland and adapted to receive the entire discharge of lubricant from the outlet-duct of the gland when the outlet-duct is disposed within the orbit of travel of the said grooved-portion, said grooved-portion having lubricant-conducing connections with said reservoir to return thereto the by-passed lubricant.

3. In a sewing machine, a rotary shaft having a lubricant-conducting channel which opens in the periphery of the shaft, lubricant metering means comprising a gland in contact with the shaft and mounted for sliding movement relatively thereto and constrained from rotation therewith, said gland being provided with a lubricant-cavity which opens in that portion of the gland which is in contact with the shaft, a bearing-bushing for said rotary shaft, an adjusting screw operatively connected to said gland and bushing elements, said screw being threaded into one of said elements and anchored in the other to shift the gland lengthwise of the shaft to vary the position of the opening of the lubricant-cavity in the gland with respect to the path traced by the peripheral opening of the lubricant-channel in the shaft upon rotation of the shaft, and a bearing having lubricant connections with the channel in said shaft.

4. In a sewing machine, a rotary shaft having a lubricant-conducting channel which opens in the periphery of the shaft, a gland in contact with said shaft and mounted for sliding movement relatively thereto in the vicinity of the peripheral opening of said channel in the shaft, said gland being provided with a lubricant-cavity which opens in that portion of the gland which is in contact with the shaft, a bearing-bushing for said shaft, said bushing being provided with a constraining arm for preventing rotation of the gland, spring means engaging said gland and normally tending to shift it away from said bushing, screw means for shifting the gland lengthwise of the shaft in opposition to said spring means to vary the position of the said opening of the lubricant-cavity with respect to the path traced by the peripheral opening of the said lubricant-channel upon rotation of the shaft, means for supplying lubricant to the cavity in the gland, and a bearing having a lubricant-conducting connection with the channel in said shaft.

5. In a sewing machine, a rotary shaft having a lubricant-conducting bore and a radial inlet-duct leading to said bore, a gland apertured for sliding movement upon the shaft, said gland being provided with a lubricant-cavity and with an outlet-duct connecting said lubricant-cavity with the shaft-aperture of the gland, said gland being shiftable axially of said shaft to meter the lubricant passing through the outlet duct of said gland into said inlet duct in said shaft, a bearing-bushing for said shaft, said bushing being provided with a slot for slidably accommodating the gland to prevent rotation thereof, a shoulder on said gland, an adjusting screw threaded into said bushing for acting against the shoulder to shift the gland axially upon the shaft, a grooved by-pass portion in said shaft within the range of sliding of the gland, said grooved-portion being adapted to receive lubricant from the outlet-duct of said gland when the latter is disposed within the orbit of travel of the grooved-portion, and means to discharge the lubricant entering said grooved portion.

6. In a sewing machine, a rotating shaft having an axial bore, a bearing in which said shaft is journaled, a rotary hook secured to one end of said shaft and having a raceway in communication with said bore, a gland adjustably mounted on said bearing and having a lubricant cavity in communication with said bore during operation of the machine, a lubricant reservoir, a pump and suitable conduits to draw lubricant from said reservoir and to conduct it into the cavity in said gland for transmission through said bore to said raceway, a lubricant by-pass formed in said shaft and communicating with said reservoir, means for shifting said gland relative to said bearing to vary the amount of lubricant permitted to pass from said lubricant cavity into the bore in said shaft, and means for adjusting said gland to another position in which said lubricant cavity is out of communication with the bore in said shaft and in communication with said by-pass to permit the entire flow of lubricant through said cavity to be discharged back to said reservoir.

7. In a sewing machine, a rotating shaft having an axial bore, a bearing in which said shaft is journaled, a rotary hook secured to one end of said shaft and having a raceway in communication with said bore, a gland adjustably mounted on said bearing and having a lubricant cavity in communication with said bore during operation of the machine, a lubricant reservoir, a pump and suitable conduits to draw lubricant from said reservoir and to conduct it into the cavity in said gland for transmission through said bore to said raceway, a filtering device connected with said conduits for filtering the lubricant transmitted to said cavity, a lubricant by-pass formed in said shaft and communicating with said reservoir, means for shifting said gland relative to said bearing to vary the amount of lubricant permitted to pass from said cavity into the bore in said shaft, and means for adjusting said gland to another position in which said lubricant cavity is out of communication with the bore in said shaft and in communication with said by-pass to permit the entire flow of lubricant through said cavity to be discharged back to said reservoir.

HERMAN RITTER.

REFERENCES CITED

The following references are of record in the file of this patent:

UNITED STATES PATENTS

| Number | Name | Date |
| --- | --- | --- |
| 1,817,650 | Ryder | Aug. 4, 1931 |
| 2,284,474 | Peets et al. | May 26, 1942 |